US005365075A

United States Patent [19]

Peterson

[11] Patent Number: 5,365,075
[45] Date of Patent: Nov. 15, 1994

[54] METHOD FOR AUTOMATED IDENTIFICATION OF RECYCLED PLASTIC ARTICLES WITH COMPARISON OF DIRECT AND DIFFUSE TRANSMITTED LIGHT

[75] Inventor: Paul E. Peterson, San Francisco, Calif.

[73] Assignee: Union Carbide Chemicals & Plastics Technology Corporation, Danbury, Conn.

[21] Appl. No.: 131,084

[22] Filed: Oct. 1, 1993

[51] Int. Cl.[5] .............................................. G01N 21/86
[52] U.S. Cl. ...................................... 250/571; 356/239
[58] Field of Search ............... 250/571, 572, 340, 341; 356/435, 239, 240; 209/588

[56] References Cited

U.S. PATENT DOCUMENTS

| | | | |
|---|---|---|---|
| 5,134,291 | 7/1992 | Ruhl, Jr. et al. | 250/341 |
| 5,141,110 | 8/1992 | Trischan et al. | 209/524 |
| 5,150,307 | 9/1992 | McCourt et al. | 364/478 |
| 5,260,576 | 11/1993 | Sommer, Jr. et al. | 250/359.1 |

*Primary Examiner*—David C. Nelms
*Assistant Examiner*—Steven L. Nichols
*Attorney, Agent, or Firm*—B. L. Deppenbrock

[57] ABSTRACT

A method for differentiating polymers contained in plastic articles by passing the articles between a light source and an array of detectors which are positioned in a manner such as to allow simultaneous measurements of a directly transmitted light signal and a diffused light signal. The transmitted light signal and diffused light signal are compared and used as a basis for differentiating the polymers.

7 Claims, 1 Drawing Sheet

METHOD FOR AUTOMATED IDENTIFICATION OF RECYCLED PLASTIC ARTICLES WITH COMPARISON OF DIRECT AND DIFFUSE TRANSMITTED LIGHT

FIELD OF THE INVENTION

The present invention relates to the recycling of plastic articles and more particularly to a method for automated identification of plastic articles which have similar identification characteristics when exposed to a direct light source.

The need to conserve our planet's resources has led to a strong drive to recycle, particularly those items of a plastic constituency. While some of the recycle plastic can be used as "plastic lumber" (cf., U.S. Pat. No. 4,187,352), successful use of recycled polymers which are used in the plastic material will not be achieved without accurate identification of the polymeric articles and separation into the appropriate constituent resin groups e.g., high density polyethylene (HDPE) natural and pigmented, polyethylene terephthalate (PET) clear, green, and amber, etc. In addition to gross separation, some polymers require very low levels e.g., near zero of contamination in order to have further utility. Merely as illustrative, it is well known that even low levels of polyvinyl chloride (PVC) [ca. 50–100 ppm] can degrade PET sufficiently to render it commercially unacceptable.

Most identification and separation of the various types of plastic from each other is done by manual labor, with some attempts being made to automate the process. Unfortunately however hand sorting has several disadvantages such as high labor cost, low production rates, sort accuracy, worker safety and health issues. In order for plastics' recycling to reach the overall levels desired by today's society, it is necessary to overcome these difficulties. It is especially important to improve the economics of identifying and sorting or separating the plastic articles into their constituent polymers for ultimate reuse. In order to understand the complexity of the task, there are probably some ten to fifteen sort categories for plastics that could be removed from solid waste stream and recycled if economical sortation can be achieved.

A review of the prior work in the area of automated sorting of recycled plastics indicates that all have at least one significant flaw. In many cases, it is because the technology can only be used to perform a binary separation. In other cases, the technology cannot handle a particular critical sort or cannot adapt to other polymers. Essentially none of the techniques available today can handle the mix of polymers that can exist in municipal solid waste. The ability to collect, identify, sort, clean, and resell this commingled feed stream is a key to the success of the future of plastics recycling.

Several techniques are presently being employed to identify and sort plastic materials. Thus, European Patent Application 0291959 (filed May 18, 1988) discloses the use of high-energy electromagnetic radiation (X-rays and gamma rays) to identify polymers, specifically polyvinyl chloride (PVC) and PET.

U.S. Pat. No. 4,884,386 teaches the use of X-rays to separate plastic articles into two groups.

In addition several techniques for identifying and sorting plastic articles have been developed that require the application of some type of code (e.g., bar code) at the time the article is manufactured. See for example DE 3,934,969 and CH 721,949. While potentially useful at first look, these techniques have two significant disadvantages: packaging manufacturers must place the code on the articles at the time of manufacture and the code must still be readable by a sensor after the article has been crushed and become dirty during the initial stages of the recycle process.

In still another technique for sorting plastic articles, a video camera(s) and image analysis are utilized to sort the plastic articles. Thus DE 3,520,486 teaches a method whereby the plastic articles are scanned by a video camera and the data analysis algorithm is "taught" what each article is so that it can be sorted properly. Unfortunately this technique is limited in its ability to identify the polymer type(s) used in the article, particularly those which exhibit similar characteristics upon exposure to the direct light source. Moreover, since the system is "taught" by its experience, any new polymer or article shape will not be recognized by the system and will then be allowed to pass, unsorted, into the overall waste system. In fact, this reference addresses this very shortcoming. More significantly, it may not be able to teach this system how to handle the same article shape made from different polymers. An example of this problem is the change in the construction of the plastic ketchup bottle. With no change to the shape and little change to the appearance (slightly shinier in its pristine [before recycling]state), a system such as advocated by the reference could not differentiate between the polymers used originally (primarily polypropylene) and the polymers used now (nearly all PET).

A preferred method appears to use the inherent characteristics of the polymer used to manufacture the articles. One commercial system, offered for sale by Magnetic Separation Systems (MSS) of Nashville, Tenn. provides separation of commingled plastics based on the inherent transmissivity of the polymeric article. While this technique is valuable in some cases, it is insufficient however to separate polymeric articles adequately. For example, this teaching cannot discriminate between clear PVC and PET clear or green. As previously noted, because of the significance of PVC contamination in PET, this is a serious shortcoming.

Notwithstanding the advances made in the automated plastic recycle art, there is, unfortunately, a problem which still persists. Current techniques are not entirely satisfactory when it is desired to separate articles which have similar identification characteristics. For example, current techniques do not provide a commercially acceptable means for differentiating polymers having similar characteristics when exposed to a direct light source such as high density polyethylene plastic articles and polypropylene plastic articles. Hence, there still exists a need for a method for differentiating high density polyethylene from polypropylene and like polymers contained in plastic articles so that these different polymers can be identified and separated.

SUMMARY OF THE INVENTION

Broadly contemplated, the present invention provides a method for differentiating polymers contained in plastic articles which exhibit similar identifying characteristics upon being exposed to a direct light source which comprises (1) passing said plastic articles between a light source and an array of detectors, said detectors being positioned in a manner such as to allow simultaneous measurement of a directly transmitted light signal and a diffused light signal, (2) comparing said transmitted light signal to said diffused light signal, and (3) utilizing the result of the comparison of step (2) to differentiate said polymers.

DETAILED DESCRIPTION OF THE INVENTION

Figure 1:
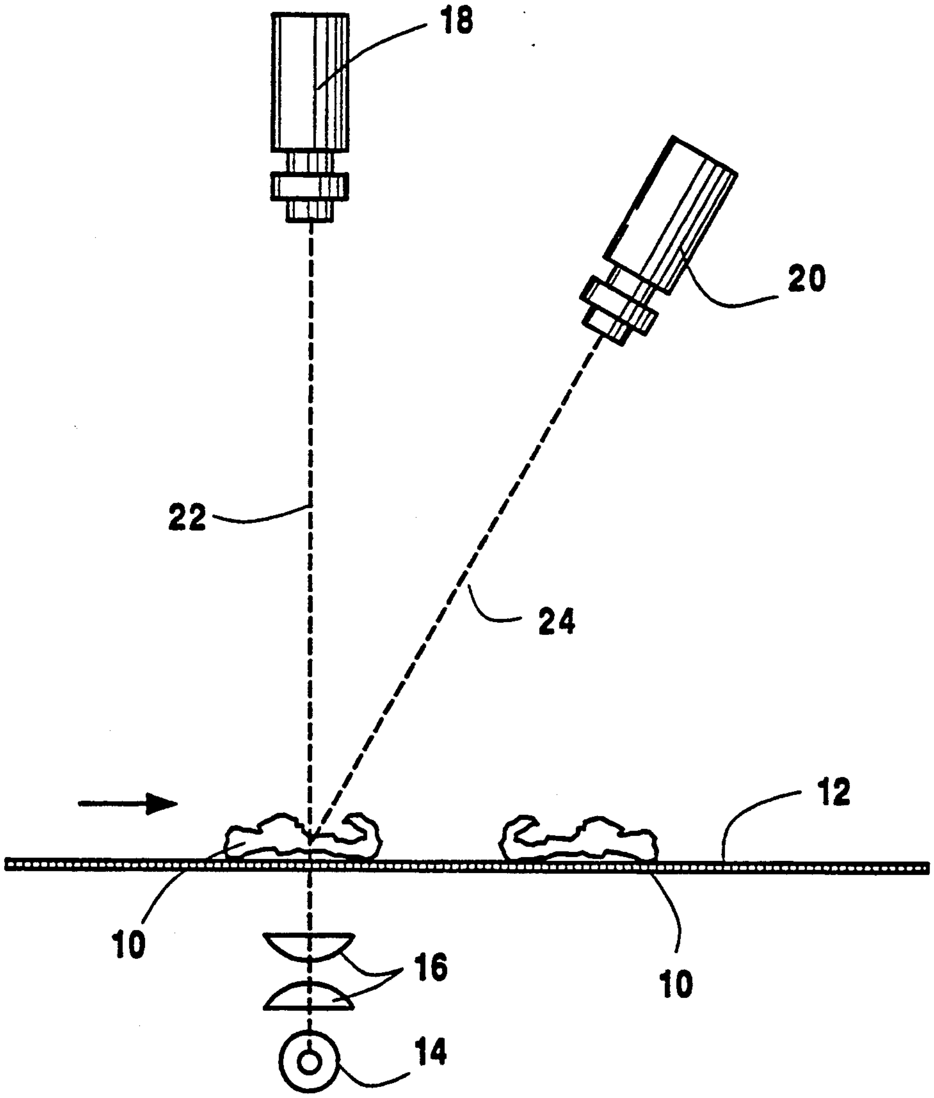
FIG. 1 is a schematic illustration of the method of the present invention.

The present invention is directed to a method for differentiating polymers exhibiting similar differentiating characteristics when the polymers are exposed to a direct light source. These polymers can be contained in plastic items or plastic articles in which each individual plastic item is made predominantly of a single material, but different plastic items are made of different materials.

It is of course known that plastic materials have inherent characteristic effects on directly transmitted light which in many cases permits identification of the plastic material for subsequent separation considerations. "Directly transmitted light" or "direct light source" as employed herein means that the light source, article to be identified or scanned, and the detector are arranged substantially co-linearly when the article passes through the light beam. Diffused light means the light scattered by a translucent article as the light beam passes through it.

Unfortunately however, polymers which exhibit similar inherent characteristics upon exposure to a direct light source are not readily identifiable one from the other thus making their separation from the array difficult. Examples of polymers which have similar inherent characteristics upon being exposed to a direct light source are high density polyethylene and polypropylene based plastic articles, natural polyvinyl chloride (PVC), especially if scratched, and natural (unpigmented) polystyrene (PS), especially if scratched. The present invention is particularly suitable for distinguishing, for identification purposes, high density polyethylene i.e., polyethylene of densities of 0.940 and above from polypropylene contained in plastic articles.

The plastic recycle methods and apparatus are well known in the art and generally include a debaler and screen; a presentation system; sensing station; separation zone or sortation zone; take away conveyors and a process control system. The present invention is particularly concerned with the sensing station portion of the recycle apparatus and method. However the other aspects of the recycle apparatus and method can be employed utilizing conventional techniques. For example the debaling and screening function and the presentation function can be as disclosed in WO 92/16312. The separation or sortation function, the take away conveyors (or function), and the process control system can be as disclosed, for example, in WO 92/16312 or in U.S. Pat. No. 5,150,307.

In the sensing station zone of the typical recycling process, there can be present a multiplicity of sensors or detectors that are chosen for the particular polymers of interest and the types of contaminants that need to be eliminated. For the purpose of the present invention, a light source and detectors are shown in FIG. 1., which can be included with the other conventional sensors or detectors in the sensing station zone. The added elements in the sensing station are capable of measuring the amount of light diffused by a transparent or translucent article. Thus, in FIG. 1 there is illustrated a direct light source and a detector positioned directly opposite the light source (conventional) and a detector positioned at an oblique angle to the light path. The objects undergoing scanning, represented by reference numeral 10 are being transported on a conventional conveyor belt, 12. The conveyor belt 12 is substantially transparent and can be one of several available commercially such as a steel open-mesh belt available from the Wire Belt Company of America in Winchester, Mass.

For the purpose of describing the present invention, it will be assumed that the recycling apparatus is adequately identifying and sorting dissimilar constituent polymer types contained in plastic articles such as clear and green PET(including soft drink bottles with or without base cups), amber PET, clear PVC, which have been identified conventionally by a direct light source and identified for separation. In the feed stream plastic articles which contain polymer constituents exhibiting similar characteristics when exposed to a direct light source are also present e.g.. HDPE and polypropylene which are difficult to identify and separate by conventional direct light source techniques.

Referring again to FIG. 1 the articles on conveyor belt 12 pass between a detector and a light source indicated by reference numeral 14 which provides light which is directed through lens 16 and through the article on conveyor belt 12. A through light detector 18 is positioned directly opposite the light source and in a preferred embodiment is arranged substantially perpendicular to the plane of conveyor belt 12. Angularly disposed to the light path 22 generated by light source 14 is diffuse light detector 20. Through light detector 18 measures light transmissivity and diffuse light detector 20 measures diffused light. The diffuse light detector is placed at an angle to the light path of about 50° to about 70° preferably at an angle of about 55°–65° . A wider range of angles can be used within the spirit of the invention, however, sorting accuracy can be expected to suffer somewhat.

The detectors which can be employed according to the present invention can be of the type which are normally employed in the recycling art. As is known, detector assemblies use an array of photosensitive elements. The assembly collects data by measuring photon interaction at each element within the array. According to the present invention the photo sensitive elements can be, for example, photo transitors, photodiodes, and/or cameras. In a preferred mode, a particular type of camera known as a charge coupled device (CCD) is used.

The light source which can be employed can also be of the type which is conventional in the art. The light source may be either polychromatic or monochromatic. Merely as illustrative the following light sources can be employed: tungsten, tungsten-halogen, fluorescent, light-emitting diode, or laser.

In a typical mode of operation and utilizing conventional techniques (except for the practice of the present invention), the plastic articles, which have been previously directed through a debaler and screen and a presentation system are now ready for entrance into the sensing station. These articles when they are transported to the sensing station can contain the following constituent polymer types: clear and green PET, natural PVC, natural HDPE, and natural PP. The order of the sensors is not critical to the practice of the invention.

The system described for example in WO 92/16312 can serve as the presentation and conventional identification system. However, in order to identify for purposes of separation, articles which have similar identification characteristics, such as recycled high density polyethylene and polypropylene based plastic articles, use is made of the additional source/sensor combination of the present invention. The articles to be identified and separated pass through the apparatus indicated in FIG. 1. Through light detector 20 measures light transmissivity and diffuse light detector 20 measures diffused light 24. The diffused light detector is placed at an angle to the light beam 22 of about 55°-65° . The measurement yields a range of diffusion values which are read into a data table and compared to previously determined characteristics of recycled articles. Conventional techniques are then employed to sort and separate the different type plastic articles.

As mentioned previously sorting of the article can be accomplished by conventional procedures and do not form a part of the present invention. Merely as illustrative however, an inspection conveyor can be arrayed perpendicular to a number of off-sort conveyors (the number of which depends on the number of categories of articles to be sorted ). At each cross-over point a series of conventional air-jets is positioned so as to blow the article off the inspection conveyor onto an off-sort conveyor. Knowing the speed of the inspection conveyor and the type of article, a solenoid valve can be actuated for the appropriate set of air-jets and the article is blown from the inspection conveyor onto the off-sort conveyor.

In order to better understand the invention, the following examples, which should not be construed as limiting the scope of the invention, are provided.

The configuration of the system used to obtain the results in the examples is substantially the same as in FIG. 1, except that instead of using conveyor belt 12, the articles were moved through the light beam at 1.3 in/sec using a clamp to hold the article.

Again referring to FIG. 1, the light source 14 was a 120 VAC, 300 watt, linear-filament tungsten/halogen lamp of conventional design (Phillips model 300T3Q/CL), placed approximately 20 inches from the plane of motion of the article being scanned. Light collimator 16 was a conventional lens (Melles Griot model 01 LAG 025 with a 79 mm focal length and 84 mm aperture). Through light detector 18 consisted of an image-forming lens with a 45 mm focal length and 22 mm aperture, a conventional, four-cell, silicone-based photoelectric device similar to Model N36.644 (3V. 10 μA), available from Edmund Scientific, placed approximately 15 inches behind the plane of motion of the translation table (or approximately 35 inches from the light source). In addition, neutral density filters (Newport models ND03 and ND05) were placed in front of the through-light detector in order to attenuate the incoming light to about 16 percent). Light source 14 and through light detector 18 were arranged such that light beam 22 was substantially perpendicular to the plane of motion of the article being scanned. Diffuse light detector 20 was assembled similar to the through-light detector, except no neutral density filters were used. Signal conditioning of the output signals of both through light detector 18 and diffuse light detector 20 was done with conventional, fixed-gain, analog instrumentation amplifiers, such as Motorola model MC 34072P. In order to account for the different level of intensity between through light and diffuse light, the gain of the diffuse-light signal amplifier was set approximately 10–20 times that of the through-light signal amplifier. The signals from the diffuse-light signal amplifier and the through-light signal amplifier were input to a difference amplifier (such as Motorola model MC 34072P) that compares the two signals and produces an output signal. The gains for the through-light and diffuse-light amplifiers were set by using a 0.003 inch thick Mylar film as a reference and adjusting the gains until a near-zero output was obtained from the difference amplifier. The output signal from the difference amplifier was displayed and recorded on a conventional strip-chart recorder. The output was then used to differentiate the polymer type of the article. In the examples listed below, a negative number means the article is more diffuse, whereas a positive number means the article is more transmissive.

EXAMPLE 1

The diffuse light detector 20 was placed at an angle of about 55° to the direction of light beam 22. Articles made from clear, but crushed, dirty, and scratched, polystyrene (PS) and from clear, but crushed, dirty, and scratched, polyvinyl chloride (PVC) were scanned and the signal recorded on a Hewlett Packard Model 680, running at about 1 in/min chart speed strip chart recorder. PVC consistently showed output signals ranging from −11 to +4 units, with most of the output signal being negative (the positive results were nearly all edge effects). PS showed output signals ranging from −5 to +19 units, with most of the result being positive. While there is some overlap in the range of the results, the differences in the output signal were easily discernible, both in character and in magnitude.

EXAMPLE 2

Crushed and dirty articles made of natural HDPE and natural polypropylene were scanned using the apparatus and method of Example 1. Natural HDPE showed output signals ranging from −12 to 0 units (all of the output signal being negative). Most of the output signals for natural polypropylene ranged from −7 to +14 units, with some spikes to −9 and +25 units. Again there is some overlap in the range of the results, but the differences in the character of output signal were easily discernible.

EXAMPLE 3

The diffuse light detector 20 was placed at an angle of about 64° to the direction of light beam 22. Crushed and dirty articles of natural HDPE and natural polypropylene were scanned (3 each) as in Example 1. The results are tabulated below. The values again are in units of the strip chart recorder.

| Polymer | Bottle | Transmissive | Diffuse | Difference (Trans-Diff) |
|---|---|---|---|---|
| HDPE | 1 | 5 | 78 | −73 |
| | 2 | 1 | 100 | −99 |
| | 3 | 1 | 65 | −64 |
| PP | 1 | 34 | 51 | −17 |
| | 2 | 98 | 0 | 98 |
| | 3 | 55 | 44 | 11 |

While there is some scatter, it can easily be seen that the results obtained from these tests clearly show that natural HDPE and natural polypropylene exhibit different characteristics in this test which can be used a basis, with a conventional computer system, to separate the articles.

I claim:

1. A method for differentiating polymers contained in plastic articles which exhibit similar identifying characteristics upon being exposed to a direct light source which comprises (1) passing said plastic articles between a light source and an array of detectors, said detectors being positioned in a manner such as to allow simultaneous measurement of a directly transmitted light signal and a diffused light signal, (2) comparing said transmitted light signal to said diffused light signal, and (3) utilizing the result of the comparison of step (2) to differentiate said polymers.

2. A method according to claim 1 wherein said polymers are high density polyethylene and polypropylene.

3. A method according to claim 1 wherein said polymers are polystyrene and polyvinyl chloride.

4. A method according to claim 1 wherein said detector for measuring diffused light is placed at an angle to said directly transmitted light signal of about 50° to about 70°.

5. A method according to claim 1 wherein said detector for measuring diffused light is placed at an angle to said directly transmitted light signal of about 55°–65°.

6. A method for differentiating high density polyethylene from polypropylene contained in plastic articles which comprises (1) passing said plastic articles between a light source and an array of detectors, said detectors being positioned in a manner such as to allow simultaneous measurement of a directly transmitted light signal and a diffused light signal, said detector being employed for measuring said diffused light signal being placed at an angle to said directly transmitted light of about 50° to about 70°, (2) comparing said transmitted light signal to said diffused light signal, and (3) utilizing the result of the comparisons of step (2) to differentiate said high density polyethylene from said polypropylene.

7. A method according to claim 6 wherein said detector for measuring diffused light is placed at an angle to said directly transmitted light signal of about 64°.

* * * * *